Charles J. C. Petersen's Improved Harvester.

No. 119,172.

2 Sheets--Sheet 1.

Patented Sep. 19, 1871.

Witnesses
J. Henry Gilbert
Samuel Deall

Inventor
Charles J. C. Petersen

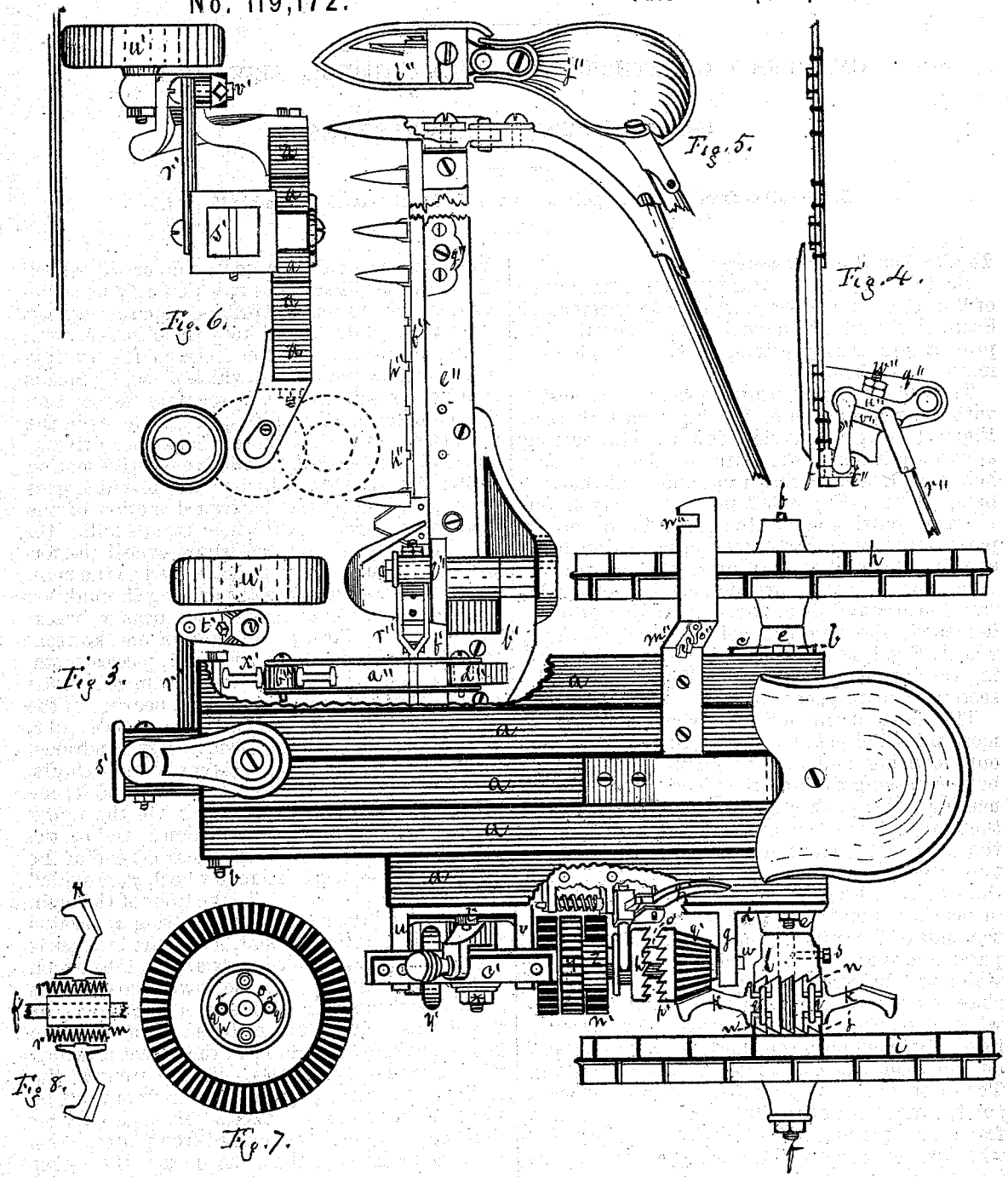

UNITED STATES PATENT OFFICE.

CHARLES J. C. PETERSEN, OF PORT CHESTER, NEW YORK.

IMPROVEMENT IN HARVESTERS.

Specification forming part of Letters Patent No. 119,172, dated September 19, 1871.

*To all whom it may concern:*

Figure 1:
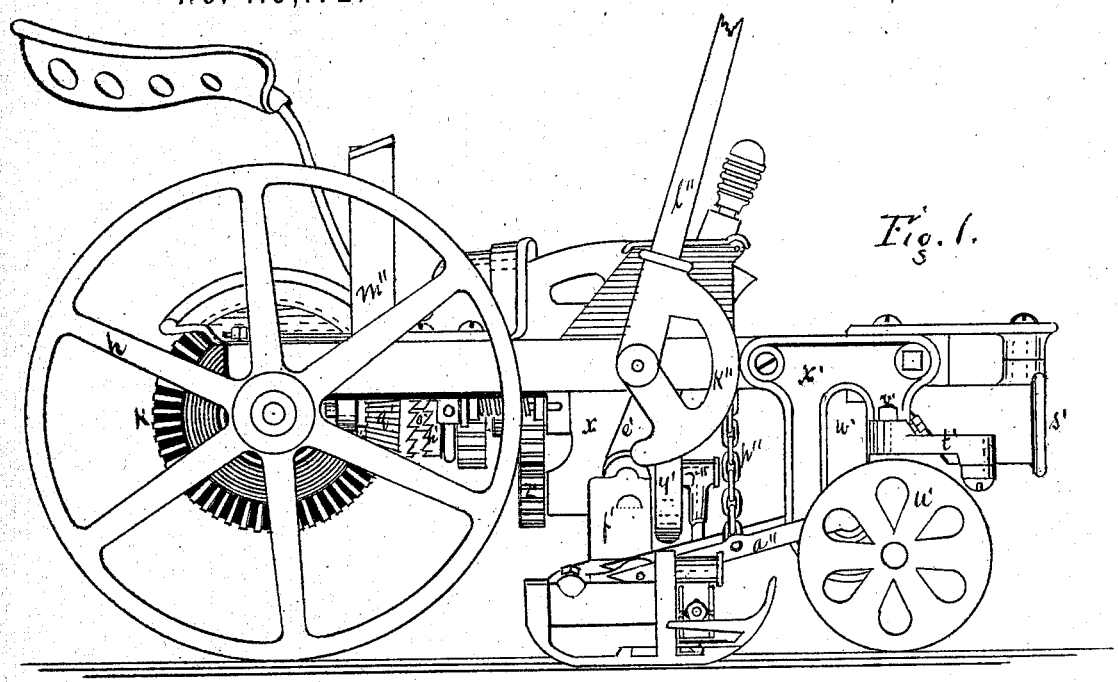
Figure 2:
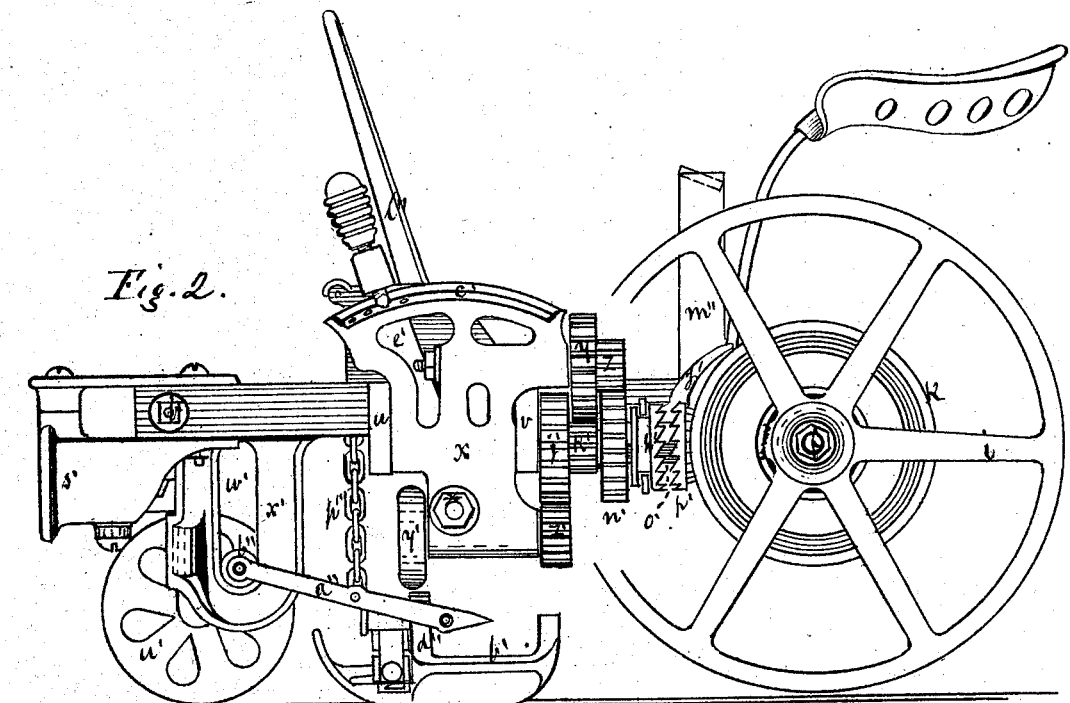

Be it known that I, CHARLES J. C. PETERSEN, of Port Chester, in the county of Westchester and State of New York, have invented certain Improvements in Harvesters, of which the following is a specification:

The accompanying drawing shows a harvester with my improvements forming a part thereof, Figure 1 being a right-side view when the cutting apparatus is down, the clutch on the gear-shaft being open, and the finger-bar and sickle-bar not being shown; Fig. 2, left-side view; Fig. 3, top view, the cutting apparatus being down, certain parts not shown; Fig. 4, view of parts detached, showing the joint connecting sickle-bar with pitman; Fig. 5, view of parts detached, showing the track-clearer and shoe; Fig. 6, front view of parts detached, showing the pole-socket and front wheel; Fig. 7, side view of main gear-wheel, showing the interior surface; and Fig. 8, transverse section of main gear-wheel.

The frame of this machine is made of five (or more or less) pieces of wood, $a$, put together without mortising, and held in contact by means of bolts $b$ passing through the pieces transversely, making a cheap, strong, and durable frame. To the rear of this frame are attached, by means of the same bolts which hold the frame together, two pieces of casting, $c$ and $d$, one on each side of the frame. These pieces $c$ and $d$ form the boxes or bearings $e$ for the main shaft $f$. The piece on that side of the frame opposite to the cutting apparatus has an arm or bracket, $g$, for a purpose which will further on be explained. On the main shaft $f$ are two driving-wheels, $h$ and $i$. The wheel $h$, on the side of the cutting apparatus, is firmly fastened onto the shaft, while the wheel $i$ on the other side runs loose on the main shaft. The loose wheel $i$ is provided with ratchet-teeth $j$ on the inner side of the hub. Between the main frame and the wheel $i$ is mounted a main gear-wheel, $k$, being loose on the shaft $f$; also, a piece, $l$, with ratchet-teeth. Between the ratchet-teeth of the piece $l$ and those of the main driving-wheel $i$ is the main gear-wheel $k$. This wheel $k$ has a long hub, $m$. On each side of the wheel and on the hub is a small plate, $n$, with ratchet-teeth. Through the wheel $k$, in a circle, $o$, around the hub, and at equal distance, or nearly so, from the hub and from each other, are holes $p$. In two of these holes are pins $q$, securely fastened, so that they extend equally on each side of the wheel. Through the other holes $r$, which may be somewhat larger, pass coiled springs, which act against the ratchet-plates $n$ and keep them in gear with the corresponding ratchet-teeth on the driving-wheel and on the piece $l$, which piece, by means of a key or set-screw, $s$, is securely fastened on the main shaft. The pins $q$ fit into holes in the ratchet-plates $n$. By these means both driving-wheels act independent and give positive motion to the main gear-wheel when the machine goes forward, while by the backward motion of the machine the main gear-wheel stands still. On the same side as the loose driving-wheel and forward of the main shaft, and fastened to the main frame by means of the bolt $t$ passing through the main frame, is a casting with two arms or brackets, $u$ and $v$. Through these arms, and horizontally in line with the main shaft, passes a stationary shaft, $w$, the back end of which extends toward the main shaft, and has a bearing in the arm $g$ of the casting $d$. Between the arms $u$ and $v$, and on the shaft $w$, hangs a small cast-iron frame, $x$. In this frame are bearings for two short shafts, at equal distance from the stationary shaft $w$, one below and one above the same. On the upper shaft is a spur-wheel, $y$, and pinion $z$, and on the lower shaft a pinion, $z'$. At the front end of the lower shaft is a small balance-wheel, $y'$, provided with a rest or wrist-pin. To the front of the main frame and on the side with the cutting apparatus is a bracket, $x'$, with a slot, $w'$. This bracket is provided with a vertical journal-box, into which is fitted a shaft, $v'$. To the lower part of this shaft is attached a front side wheel, $u'$, and to the top of this shaft, being fastened by means of a key or set-screw, a crank, $t'$, the object of which will be explained directly. To the front of the main frame and at proper distance from the side wheel $u'$ is affixed a socket, $s'$, in such manner that the wood lies between two iron plates, and a bolt passes through the same, so that the socket can be moved from one side to the other. Into this socket is fitted the pole, so that the pole can be moved up or down without moving the socket; but the motion of the pole from one side to the other will impart the same motion to the socket. To the bottom of this socket is fastened, by means of a screw or otherwise, connecting-rod, $r'$, the outer end of which is attached to the crank $t'$. By these means the motion of the pole from one side to the other imparts the same motion to the side wheel $w'$, and thus the driver can lead the machine on short curves, side draft being entirely counteracted and no weight forced on the horses' necks. On the stationary shaft $w$ and gearing into the main gear-wheel $k$ is a beveled pinion, $q'$, which has on its front end ratchet-teeth $p'$. On the same stationary shaft is a sleeve, $o'$, and a gear-wheel $n'$. The wheel $n'$ gears into the pinion $z$, and the larger wheel $y$ gears into the pinion $k'$, this pinion being in connection with a gear-wheel, $j'$, wheel $j'$ gearing with the pinion $z'$ on the lower shaft. The sleeve $o'$ of the gear-wheel $n'$ being square, outside on this square is fittted a clutch, $h'$, provided with ratchet-teeth which fit into the ratchet-teeth of the beveled pinion $q'$. The clutch is moved forward by a cam-headed lever, $g'$, near the driver's seat, and backward by a spring, so that the driver can set the gearing for motion or stop the same, as may be required. The coupling-bar is a single flat bar of iron, $f'$, with a short round piece on one end for a lever, $e'$, which is fastened thereto by a key or set-screw. The round end of the bar extends through a hole in the frame $x$, so that it can be securely fastened by means of a washer and nut, *. The top $c'$ of this iron frame forms a segment of a circle drawn from the center of the hole in which the finger-beam is fastened. On the segmental part are holes or recesses for the binding-screw of the lever. By means of this lever the finger-beam can be turned and secured in the position desired. To the other end of the coupling-bar is attached a piece, $b'$, of malleable iron or other suitable material. This piece has the double function of making a strong single joint or hinge, and forming the hinge for connecting the coupling-bar with the side bracket $x'$, by means of two parallel connecting-bars, $a''$. On the outer end of the bars is a roller, $b''$, which fits into the slot $w'$, so that the roller and bracket are between the parallel bars. The inner ends of the bars are attached by a bolt to a link, $d''$, on the malleable cast-iron piece $b'$. The finger-bar $e''$ is a strong flat iron bar, in which is planed a groove of about three-fourths of an inch on top and about one inch on the bottom. The sickle-bar $f''$ runs on top of the finger-bar and over the groove, covering the same. On the under side of the sickle-bar, between the cutters, and at equal distance, according to the width of the cutters, are pieces that fit in the groove. They are riveted to the sickle-bar, all of them, except the two outside pieces, having, on the under side, a small groove. The sickles being riveted to the top of the bar in the usual manner, the rivet-heads are not in the way, as they have plenty of room in the groove. In the middle of the finger-bar, and behind the sickle-bar, is an oil-receptacle, fastened with the same screws that fasten the middle fingers. A short screw, $g''$, plugs the mouth of this receptacle. This screw can easily be taken out and oil poured in the receptacle and the screw replaced. The oil will then distribute itself the whole length of the sickle, and will, by the pieces in the grooves, be pushed backward and forward, and thus fully lubricate the parts. The finger-bar is notched, $h''$, according to the division of fingers, and into the notch the finger is fitted in such manner that it cannot be moved from one side to the other. The sickle-plate being as thick as the sickle-bar, and resting over the top of the slot in the finger-bar, and a suitable long and strong plate being under the finger-bar, having on its extreme end a circular projection which fits into recesses bored into the under side of the finger-bar, and, by means of screws passing from the top of the finger-bar and through the same into the projection or thickened part of the finger, makes a very strong and simple connection, easily taken off and replaced when necessary. The outside shoe or divider $i''$ is made of malleable iron, in skeleton form, screwed against the end of the finger-bar, the screw passing through a slot in the divider and having its hold into a piece riveted on top of the finger-bar, the divider thus being adjustable independent of the clearer. To this piece is also connected the track-clearer, an end of this piece extending backward from the finger-bar and having a cylindrical projection on each side. The track-clearer $j''$ is made of suitable material, forming a curved plate with a short curve on top and bottom. On the end thereof is a socket, into which a suitable stick or piece of wood can be easily fastened. On that end toward the finger-beam is a lip, with a hole that fits on one of the cylindrical projections on the extended piece. An extra piece fits on the opposite cylindrical projection, and the other end of the piece is screwed to the curved plate or track-clearer. On the right side of the machine is a segment of a wheel or pulley, $k''$, on or to which is attached a lever, $l''$, in such a manner that a positive motion may be given to the pulley longitudinal with the main frame. The lever is held, by means of a spring in the socket, toward the cutting apparatus. Under the movements of this lever the cutting apparatus may be raised so as to pass over obstacles, and held in position by means of a standard or upright, $m''$, bolted to the main-frame. This upright has a right-angled or horizontal arm extending transversely from the frame over the driving-wheel. In this arm is a slot, $n''$, into which the bar of the cutting apparatus is turned upright and backward in about an angle of forty-five degrees. There is riveted to the upright a piece, $o''$, with suitable teeth, by means of which the lever is held firmly and secure when the cutting apparatus is turned back in its resting place. The cutting apparatus is held up from the ground by means of a chain, $p''$, fastened to the segmental pulley, the other end of the chain being fastened to the two parallel bars $a''$. By means of the lever $e'$ attached to the coupling-bar $b'$, and the screw on the top thereof, and the recesses in the segmental top, the cutting apparatus is securely held when the machine is moved from place to place. The sickle-bar $b''$ is operated by a connecting-rod, $r''$, attached to the wrist or wrist-pin on the balance-wheel $y'$, and by its forked end to a knuckle joint which is pivoted to the piece $q''$ of the finger-bar. One part of this joint $s''$ is pivoted to the end $t''$ of the sickle-bar, and the other end embraced by the two plates $u''$ and $v''$ of the other part of the link. These two plates also embrace the forked end of the connecting-rod. The two plates $u''$ and $v''$ are clamped together by the screw $w''$.

What I claim as my invention is—

1. The main gear-wheel $k$ in its relation to the driving-wheel $i$ and piece $l$, and constructed and operated as herein recited.

2. The stationary shaft $w$, with the wheels and pinions and clutch thereon, arranged and operating as herein set forth.

3. The side frame $x$ with the coupling-bar $f'$ attached thereto, and the lever $e'$, having the top $c'$, as arranged, for the purpose of setting the sickle-bar at different angles against the grass, and for holding the cutting apparatus firmly in its place, as described.

4. The track-clearer $j''$, in combination with the adjustable divider $i''$ and finger-bar, the parts being constructed and connected as described.

5. The arrangement of the oil-receptacle in its relation to the finger-bar and the pieces under the cutter-bar, as described.

This specification signed this 29th day of May, 1871.

CHARLES J. C. PETERSEN.

Witnesses:
SAMUEL DEALL,
J. HENRY GILBERT. (47.)